United States Patent Office 3,737,306
Patented June 5, 1973

3,737,306
METHOD FOR TREATING TITANIUM SCRAP
Charles J. Byrnes and George L. Vassilaros, Mount Lebanon Township, Allegheny County, Pa., assignors to Crucible Inc., Pittsburgh, Pa.
No Drawing. Filed July 7, 1971, Ser. No. 160,548
Int. Cl. C22b 53/00
U.S. Cl. 75—101 R   3 Claims

ABSTRACT OF THE DISCLOSURE

Removal of refractory metal inclusions from titanium scrap in particulate form by contacting the titanium scrap with a solvent of potassium hypochlorite, potassium hydroxide and potassium fluoride at an elevated temperature of about 100° C., whereby the refractory metal inclusions are dissolved in the solvent. Conventional practices may be used to detect the presence of the dissolved refractory metal in the solvent.

---

In the production of titanium-base alloys, such is conventionally accomplished by forming a consumable electrode of titanium particles and the desired alloying elements and arc melting the electrode in an evacuated furnace. In forming the electrode from the cost standpoint it is desirable to use titanium scrap. However, for purposes of homogeneous melting and controlled alloy composition the scrap used should be substantially free from refractory metal inclusions, particularly the metals columbium, tantalum, tungsten and molybdenum. These refractory metals melt at a substantially higher temperature than titanium. Therefore, during consumable electrode melting inclusions of these refractory metals present in the electrode in unalloyed form will drop in the unmelted state from the end of the electrode and into the molten metal pool therebelow. Because of their high density relative to titanium, these inclusions will then rapidly sink in the molten metal pool to the cool bottom portion thereof and remain in the resulting ingot in unmelted form. Consequently, the final ingot and products made therefrom will suffer from these inclusions present in the form of internal discontinuities.

It is accordingly the primary object of the present invention to provide a method for removing refractory metal inclusions from titanium and particularly titanium scrap in particulate form. The method finds utility both in applications wherein the inclusions are to be removed to provide an inclusion-free scrap charge for use in consumable-electrode manufacture and also as a means for sampling titanium scrap to determine the presence of refractory metal inclusions.

Broadly in the practice of the invention of a quantity of titanium, which typically is titanium scrap, having in admixture therewith refractory metals is placed in a solvent. The solvent comprises potassium hypochlorite, potassium hydroxide and potassium fluoride, preferably with potassium hypochlorite being present in the major amount in the solvent. The solvent serves to dissolve the refractory metals while leaving the titanium substantially undissolved. Although solvents are known that will dissolve refractory metals they also tend to dissolve the titanium to an extent that renders the practice inefficient and uneconomical. Preferably, the solveint comprises, in weight percent 15 to 30 potassium hypochlorite, 25 to 40 potassium hydroxide and 1 to 15 potassium fluoride. To increase the efficiency of the solvent it is preferred during contact with the titanium and refractory metal that it be at a temperature within the range of 80 to 120° C. and preferably about 100° C. The efficiency of the solvent in dissolving the refractory metals is increased by operating at the aforesaid elevated temperatures. Although the time of contact is related to the degree of dissolution achieved, times on the order of about 60 minutes have been found to be adequate for substantial dissolution of refractory metals and particularly columbium. It is to be understood, however, that this time can vary depending upon the amount of refractory metal to be dissolved and the desired degree of refractory metal removal. In applications wherein it is desired to detect the presence of refractory metals, relatively shorter times necessary only to dissolve a detectable amount of refractory metal would desirably be employed. In any event times on the order of 20 to 90 minutes for contact of the titanium and refractory metal with the solvent are believed to be the practical limits for refractory-metal detecting applications.

In applications where it is desired only to detect the presence of refractory metals with titanium, after contact of the titanium and refractory metal with the solvent the solvent is drained from the material and analyzed for the presence of the refractory metals of interest. Analysis may be made by various conventional techniques including X-ray fluorescence or atomic absorption.

EXAMPLE I

Titanium scrap in an amount of 1,517 grams and having controlled addition of tungsten, columbium, tantalum and molybdenum in particulate form was placed in a 800 milliliter Teflon beaker. A solvent was introduced in an amount sufficient to cover the material in the beaker and was maintained at a temperature of 100° C. The solvent composition and the dissolution rate of the metals relative to time in contact with the solvent is reported in Table I:

TABLE I

Effect of 200 ml. 40% KOH plus 75 ml. KOH saturated with $Cl_2$ plus 2% KF (6 gr.) at 100° C. and 1 atm.

| Element, weight, gms. | Dissolution, percent | Exposure time, minutes |
|---|---|---|
| Ti, 1,500 | (¹) | |
| W, 0.9706 | 13.0 | 30 |
| Nb, 0.0795 | 84.8 | 30 |
| Ta, 0.1630 | 2.5 | 30 |
| Mo, 0.1369 | 26.2 | 30 |

¹ Not significant.

EXAMPLE II

An additional test was made with a procedure identical to that of Example I with solvent and results as reported in Table II:

TABLE II

Effect of 50 gr. KOH in 400 ml. $H_2O$, $Cl_2$ passed through solution til neutral to Litmus Paper; 140 grams KOH plus 10 grams of KF at 100° C. for 1 hour

| Element, weight, gms. | Dissolution, percent | Exposure time, minutes |
|---|---|---|
| Ti, 1,517 | 0.66 | 60 |
| W, 1.5242 | 24.10 | 60 |
| Nb, 0.2879 | 100.00 | 60 |
| Ta, 1.1010 | 14.30 | 60 |
| Mo, 0.2589 | 44.50 | 60 |

As may be seen from the data of Table II the solvent composition was extremely effective in achieving a compromise with respect to the amount of dissolution of titanium and the refractory metals present therewith.

Analysis of the solvent in cases of both Examples I and II were made by conventional atomic absorption analyses.

We claim:
1. A method for removing refractory metal inclusions from titanium comprising contacting a quantity of titanium containing at least one refractory metal selected from the group consisting of tungsten, columbium, tantalum and molybdenum with a solvent solution comprising, in percent by weight, 15 to 30 potassium hypochlorite, 25 to 40 potassium hydroxide and 1 to 15 potassium fluoride and at a temperature of 80 to 120° C., whereby said refractory metal is dissolved in said solvent solution.

2. The method of claim 1 wherein said solvent is in contact with said titanium and refractory metal for 20 to 90 minutes.

3. The method of claim 1 wherein said solvent is at a temperature of about 100° C. during contact with said titanium and refractory metal.

References Cited

UNITED STATES PATENTS

| 2,724,667 | 11/1955 | MacPherson | 75—121 X |
| 2,750,271 | 6/1956 | Cueilleson et al. | 75—121 UX |
| 2,753,262 | 7/1956 | Herres et al. | 75—44 S |
| 2,864,690 | 12/1958 | Lee et al. | 75—121 X |
| 2,992,098 | 7/1961 | Boozenny et al. | 75—121 X |

FOREIGN PATENTS

| 752,550 | 7/1956 | Great Britain | 75—101 R |

HERBERT T. CARTER, Primary Examiner

U.S. Cl. X.R.

75—121; 134—2